Patented Feb. 3, 1942

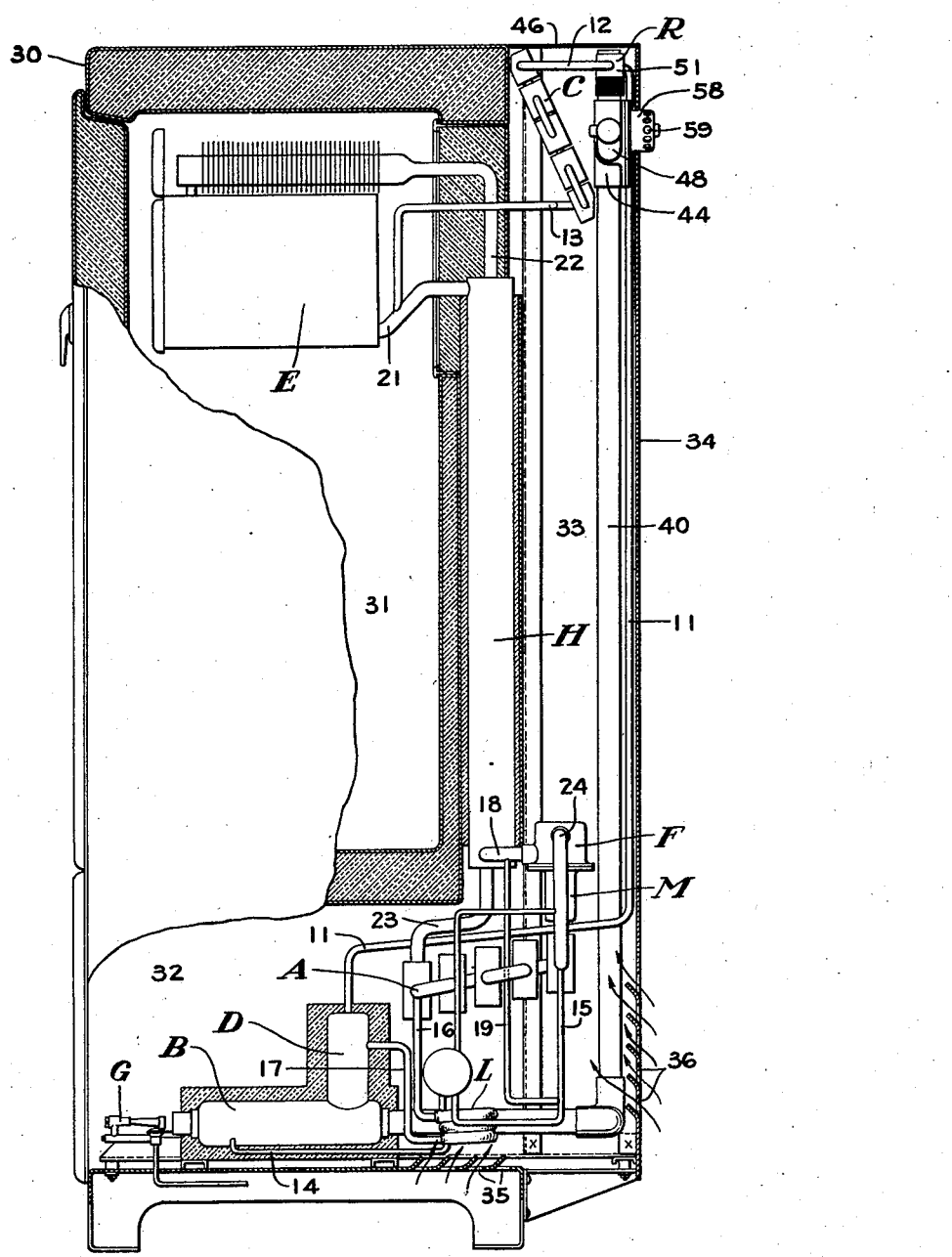

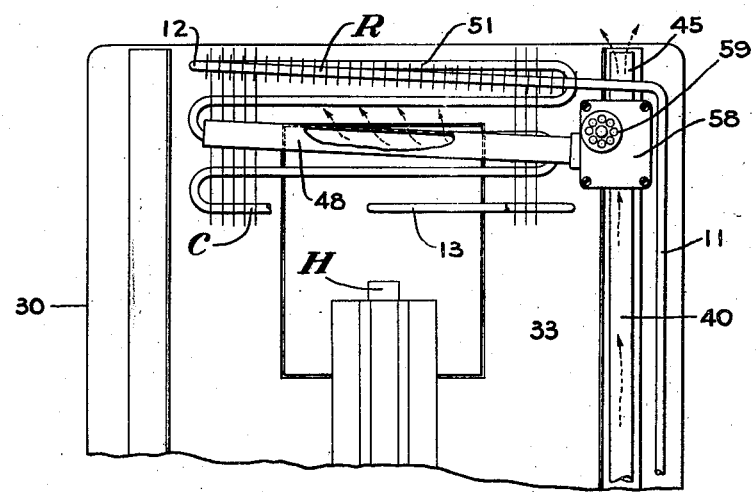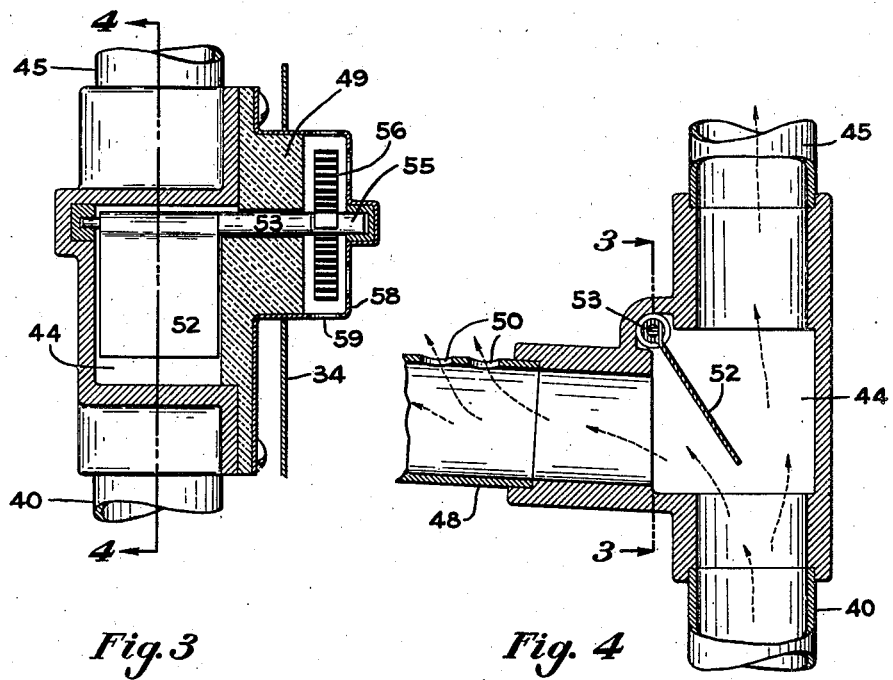

2,271,543

UNITED STATES PATENT OFFICE 2,271,543

REFRIGERATION

Curtis C. Coons, North Canton, Ohio, assignor to The Hoover Company, North Canton, Ohio, a corporation of Ohio Application October 10, 1938, Serial No. 234,164

13 Claims. (Cl. 62—5)

This invention relates to absorption refrigerating apparatus, and more particularly to an improved rectifier assembly therefore which operates with high efficiency irrespective of wide variations in the room temperature.

One of the great problems encountered in the absorption refrigeration art results from the fact that when heat is supplied to the solution of refrigerant in an absorbent in the boiler of a refrigerating system to separate the refrigerant from the absorption liquid, a considerable amount of absorption liquid is distilled off with the refrigerant. If this absorption vapor passes with the refrigerant vapor into the condenser, the operation of the entire absorption system is adversely affected.

In absorption refrigerating apparatus in which the heat rejecting parts are air-cooled, the separation of the absorption liquid vapor from the refrigerant vapor is affected by changes in the ambient air temperature. If the apparatus is designed for proper rectification at high air temperatures, then rectification is improper at low temperatures, and a considerable amount of refrigerant vapor will be condensed and returned to the boiler. On the other hand, if the apparatus is designed to operate efficiently at low air temperatures, and the temperature of the air rises, absorption liquid vapor passes along with the refrigerant vapor into the condenser. This condition adversely affects the operation of the apparatus.

The temperature of the rectifier should be maintained between the boiling temperatures of the refrigerant medium and of the absorbent medium therefor regardless of the temperature of the air in the vicinity of the rectifier. If ammonia is being employed as the refrigerant, and water as the absorbent, it will be appreciated that the problem presents considerable difficulty because of the proximate critical or boiling temperatures of the mediums.

It is accordingly an object of this invention to provide means whereby an air-cooled rectifier for an absorption refrigerating apparatus can be maintained at a temperature between the critical temperatures of the refrigerant and absorption fluid independently of the temperature of the cooling medium for the rectifier, and particularly where such cooling medium is the surrounding air.

It is another object of this invention to utilize the waste heat from the boiler to assist in regulating the temperature of the rectifier so that the latter will be maintained at the correct rectifying temperature, and to control the utilization of the waste heat of the boiler in accordance with the temperature of the air flowing over the rectifier.

More specifically, it is an object of this invention to provide automatic temperature responsive means for varying the temperature of the rectifier as required by changing operating conditions, such as a change in room temperature condition, by the simple expedient of causing a greater or a lesser amount of the products of combustion from the boiler to mingle with the air surrounding the rectifier.

Other objects and advantages of the invention will become apparent as the description proceeds when taken in connection with the accompanying drawings in which:

Figure 1 shows the invention applied to an absorption refrigerating apparatus mounted on a domestic refrigerator cabinet with the parts broken away to show the various parts of the apparatus;

Figure 2 shows the back view of the upper portion of the apparatus mounted on a refrigerator cabinet and of the means for distributing the products of combustion over the rectifier;

Figure 3 is a sectional view of the temperature responsive means for controlling the distribution of the products of combustion over the rectifier;

Figure 4 is a sectional view on lines 4—4 of Figure 3.

This invention is primarily concerned with the utilization of waste heat from a refrigeration system in order to regulate the rectifier for proper and efficient operation. However, in order to obtain a proper understanding of the invention it is necessary to understand the system of which it is a unit. For this reason the system will be described generally before undertaking a detail explanation of the rectifier and regulating construction with which this invention is particularly concerned.

Referring to Figure 1, the absorption refrigerating apparatus is seen to comprise a boiler B, an analyzer D, an absorber A, a rectifier R, a condenser C, an evaporator E, a gas heat exchanger H, a liquid heat exchanger L, and a circulating fan F and driving motor M therefor, all connected together by suitable conduits to form a hermetically sealed refrigerating system.

The above described refrigerating system will be charged with a suitable refrigerant, such as ammonia, a suitable absorbent, such as water, and an inert pressure equalizing medium preferably a dense inert gas, like nitrogen.

The boiler B may be heated in any suitable manner but it is preferred to utilize a gas burner G for this purpose.

The apparatus will be controlled in any manner desired as by a thermostatic mechanism which simultaneously governs the energization of the heater for the boiler and of the electrical motor M. A preferred control mechanism is illustrated, described and claimed in the co-pending application of Curtis C. Coons, Serial No. 148,424, now Patent No. 2,228,343, filed June 16, 1937.

The application of heat to the boiler B generates refrigerant vapor from the solution therein contained which passes upwardly through the analyzer D in counterflow relationship to strong solution flowing downwardly therethrough. An appreciable quantity of absorption solution vapor is generated in the boiler and also passes into the analyzer D. Part of this vapor condenses in the analyzer and serves to generate further refrigerant vapor from the strong solution flowing downwardly therethrough. The refrigerant vapor and uncondensed absorption solution vapor is conveyed from the upper portion of the analyzer D to the rectifier R by way of a conduit 11. The absorption solution vapor content of the mixture is condensed in the rectifier and is returned to the analyzer through the conduit 11 in a manner to be described more fully hereinafter. The refrigerant vapor is conveyed from the rectifier R into the upper portion of the tubular air-cooled condenser C by a conduit 12. The refrigerant vapor is liquefied in the condenser and is discharged therefrom through a conduit 13 into the bottom portion of the evaporator E.

The weak absorption solution formed in the boiler by the generation of refrigerant vapor is conveyed from the boiler through the conduit 14, the outer path of the liquid heat exchanger L, and the conduit 15 into the upper portion of the tubular inclined absorber A through which it flows by gravity in counterflow relationship to a pressure equalizing medium refrigerant vapor mixture flowing upwardly through the absorber. The refrigerant vapor content of the mixture is absorbed in the absorber and the heat of absorption is rejected to cooling air flowing thereover. The strong solution formed in the absorber is conveyed therefrom to the upper portion of the analyzer D by way of the conduit 16, the inner path of the liquid heat exchanger L, and a conduit 17. The absorption solution is circulated by connecting a small bleed conduit 19 between the inert gas discharge conduit 18 of the circulating fan F and the weak solution conduit 15 below the liquid level therein whereby the absorption solution is elevated into the absorber by gas lift action.

The inert gas discharged by the circulating fan through the conduit 18 flows through the gas heat exchanger H and into the bottom portion of the evaporator E through a conduit 21. The inert gas meets the liquid refrigerant discharged through the conduit 13 and drags or sweeps the same upwardly through the evaporator as it is evaporating thereinto to produce refrigeration. The particular evaporating action occurring is fully described and claimed in the co-pending application of Curtis C. Coons and William H. Kitto, Serial No. 220,189, filed July 20, 1938. The rich gas mixture formed in the evaporator E is conveyed therefrom to the conduit 22, the inner path of the gas heat exchanger H, the conduit 23 to the bottom portion of the absorber through which it flows as described heretofore. The lean gas formed in the absorber is conveyed to the suction inlet of the circulating fan F by the conduit 24, thus completing the inert gas circuit.

The various elements of the apparatus may be mounted on a suitable frame, as indicated in Figure 1, in order that the complete assembly may be inserted into a cabinet 30 as a unit. It will be noted that the cabinet is formed to provide a food storage compartment 31 and an apparatus compartment 32 extending below and to the rear of the food compartment. The apparatus compartment 32 includes an air flue 33 formed by the rear wall of the cabinet proper and a rear panel 34 extending up the back of the cabinet to provide for the circulation of air over the heat rejecting portions of the apparatus, such as the absorber A, rectifier R, and condenser C. The bottom and back walls of the apparatus compartment may be provided with suitable air inlet openings 35 and 36 as indicated in Figure 1 to provide for free flow of cooling air into the compartment 32 and 33 for the purpose of carrying off the heat rejected from the various heat rejecting portions of the apparatus.

The rectifier regulating mechanism will now be described in detail: The products of combustion formed by the burner G are discharged into a tube passing through the central portion of the boiler B which communicates with a products of combustion discharge flue 40 extending rearwardly through the compartment 32 and upwardly in a rear corner of the flue 33 to the top portion of the cabinet 30.

It will be noted from an inspection of Figure 2 that the products of combustion flue 40 is positioned in one corner of the air flue 33 whereby it is not in position to be swept by cooling air destined to flow over the condenser C and rectifier R and further that it does not obstruct free flow of air which has passed over the absorber A.

The condenser C inclines downwardly and rearwardly away from the rear wall of the cabinet 30 in such fashion that air which has once been heated by passing over the condenser does not contact or flow over the wall of the insulated refrigerating chamber 31 or over the rectifier R. Furthermore, the rectifier R which is the hottest of the heat rejecting elements positioned directly in the flue 33, is mounted at the upper rear corner of that flue whereby the same will have a minimum heating effect from the rear walls of the insulated compartment 31.

The products of combustion flue 40 opens into a control chamber 44 adjacent the top portion of the flue 33 slightly below the level of the rectifier R. The chamber 44 is provided with an upstanding discharge flue 45 which terminates just short of the level of the top wall of the cabinet 30 beneath the reticulated flue cover plate 46. A distributing duct 48 extends outwardly and slightly upwardly from the side of the chamber 44 beneath the rectifier R and in parallel relationship therewith. The upper surface of the distributing duct 48 is provided with a plurality of discharge openings 50 which are directed toward the fins 51 mounted upon the rectifier R.

In the rectifier the solution vapor is progressively condensed together with some refrigerant vapor. At the inlet end of the rectifier mainly solution vapor is condensed at a high temperature whereas the lower temperature prevailing at the outlet end of the rectifier causes condensation of some refrigerant. The backwardly flowing refrigerant is re-vaporized in the hotter portions of the rectifier partly by contact with hot vapor and partly by the heat of condensation of the solution vapors. It will be noted from Figure 2 that the rectifier R slants backwardly toward its point of connection with the conduit 11 whereby absorption solution condensed therein may flow by gravity back to the boiler through the conduit 11.

A products of combustion diversion control flap valve 52 is pivotally mounted on a spindle 53 in a corner of the chamber 44 between its point of connection with the conduits 45 and 48. The mounting of the valve plate 52 is such that it may completely close either of the ducts 45 or 48 or may assume an intermediate position, such as that illustrated in Figure 4, whereby the products of combustion discharging from the conduit 40 will be divided in any desired proportion between the conduits 45 and 48. The spindle 53 is pivotally mounted in the opposite side walls of the chamber 44 and is provided with an extension 55 extending outwardly through a block of heat insulating material 49 which is carried on the outer wall of the chamber 44 for purposes to be described hereinafter.

The extension 55 of the spindle 53 is rigidly attached to one end of a spiral type thermostatic element 56 which surrounds the extension 55. A suitable housing cover plate 58 surrounds the extension 55 and the thermostat 56 and is suitably secured to the insulating block 49. The cover plate 58 also forms an anchorage for the free end of the thermostat 56. The housing 58 is provided with a plurality of perforations 59 to permit free access of the air to the thermostatic element 56. As illustrated, the housing 58 projects rearwardly of the cabinet through an opening in the panel 34 to expose the thermostat to the ambient air, however, the thermostat could be positioned within the flue 33 if desired.

Though a particular type of thermostatic actuator responsive to air temperature has been illustrated and described herein, the invention may be practiced equally well with any other type of thermostatic actuator. Also, the thermostat may respond directly to the temperature of the rectifier instead of indirectly by way of the cooling air temperature as herein disclosed.

The operation of the invention will now be described: The refrigerating apparatus is preferably designed in such fashion that the rectifier will eliminate substantially all the absorption solution vapor flowing through the conduit 11 when the temperature of the cooling air in the room housing the refrigerator cabinet is at its maximum value, for example 110° F. Under these conditions the thermostatic element 56 will have actuated the control valve 52 in a clockwise direction, as viewed in Figure 4, to close off the inlet end of the duct 48 whereby all products of combustion flowing through the conduit 40 are discharged into the room through the conduit 45. As the temperature of the cooling air drops, the rectifier will be found to have too much cooling capacity whereby it will tend to condense refrigerant vapor as well as absorption solution vapor which results in a direct loss of efficiency because of the waste due to heat which was required in the boiler to vaporize the condensed refrigerant vapor. This is a highly undesirable condition which is corrected by the instant invention. As the room temperature drops, the thermostat 56 actuates the valve element 52 in a counterclockwise direction, as viewed in Figure 4, in order to permit a portion of the products of combustion discharging through the flue 40 to flow into the distributing duct 48 to mingle with the cooling air flowing over the rectifier R and to raise the temperature of such air. The effect of this is to utilize the waste products of combustion in the boiler to regulate the temperature of the cooling medium to the rectifier to maintain the rectifier at its most efficient operating temperature condition. The position of the flap valve 52 will vary widely with changing conditions of cooling air flowing through the flue 33 as is necessary in order to compensate the rectifier to these widely varying conditions.

The thermostatic control element, the actuating element 56 of the spindle 53, will be calibrated in such fashion that the temperature of the rectifier is maintained at all times at a temperature between the boiling temperatures of the refrigerant and absorbent used in the particular refrigerating system. This is the desired condition and the one which produces maximum operating efficiency in an absorption refrigerating system.

It will be understood that it is not desirable to have the thermostatic element 56 regulate the rectifier temperature with a straight line function for the reason that changing atmospheric conditions not only alter the temperature of the cooling air available in the flue 33 but they also cause changes in the pressure within the system which results in corresponding changes in the boiling point of the refrigerant and the absorbent. For example, as the temperature of the cooling air drops the pressure within the system drops which is followed by a consequent drop in the critical boiling temperatures of the refrigerant and the absorbent if ammonia and water are used. Hence, it is no longer necessary to maintain the rectifier temperature at such a high value in order that the same may operate at its maximum efficiency. However, it will be necessary to heat the cooling air increasingly with decreasing room temperatures and system pressures for the reason that the temperature of the cooling air drops more rapidly than the boiling temperature of the absorbent and refrigerant if these substances are ammonia and water, which substances are most commonly utilized in systems of this type. However, it will be understood that with other types of refrigerants and absorbents it may be necessary to calibrate the thermostatic element in a different manner in order that it may regulate properly for refrigerants and absorbents having pressure, temperature and solution characteristics different from ammonia and water. For example, if the critical temperatures of the refrigerant and absorbent as determined by the system pressure drop very rapidly it may be necessary to apply heat to the rectifier at high room temperatures and to discontinue the application of heat progressively as the temperature of the cooling medium drops.

It is to be understood that the protection herein applied for is not confined to the particular combinations of features or elements set out in the following claims. Protection is herein applied for any one or more of the features or elements referred to in the following claims, or described in the foregoing specifications or shown in the accompanying drawings, either independently or in combination.

While the invention has been described and illustrated in detail, various changes may be made in the arrangement, construction and proportion of parts without departing from the spirit of the invention or the scope of the appended claims.

I claim:

1. In an absorption refrigerating apparatus including a boiler, and an air-cooled rectifier, fuel burning means for heating the boiler, means for leading products of combustion into heat exchange relation with said air-cooled rectifier, and means for controlling the quantity of products of combustion being led into heat exchange relation with said rectifier.

2. In an absorption refrigerating apparatus including a boiler, and an air-cooled rectifier, fuel burning means for heating the boiler, means for leading products of combustion into heat exchange relation with said air-cooled rectifier, and means responsive to the temperature of the cooling air for controlling the quantity of products of combustion being led into heat exchange relation with said rectifier.

3. In an absorption refrigerating apparatus including a boiler having a flue, and an air cooled rectifier, fuel burning means for heating said boiler, conduit means communicating with said flue for conducting the products of combustion into heat exchange relationship with said rectifier, and means in said conduit means for controlling the quantity of the products of combustion conducted into heat exchange relationship with said rectifier.

4. In an absorption refrigerating apparatus including a boiler having a flue, and an air cooled rectifier, means for heating said boiler by means of a combustible fuel, conduit means communicating with said flue for conducting the products of combustion into heat exchange relationship with said rectifier, and temperature responsive means in said conduit means for controlling the quantity of the products of combustion conducted into heat exchange relationship with said rectifier.

5. An absorption refrigerating apparatus comprising a cabinet having an apparatus compartment and a food storage compartment, a boiler, an absorber, a rectifier and a condenser in said apparatus compartment, a cooling unit in said food storage compartment, said rectifier and condenser being connected serially between said boiler and said cooling unit, means providing for the circulation of air over the absorber, rectifier and condenser to cool the same, means for heating the boiler by means of a combustible fuel and means for conducting products of combustion into heat exchange relation with said rectifier, and means for varying the quantity of products of combustion brought into contact with said rectifier in response to changes in the temperature of the air flowing to said rectifier to vary the cooling effects of said air.

6. An absorption refrigerating apparatus comprising a cabinet having an apparatus compartment and a food storage compartment, a boiler, an absorber, a rectifier and a condenser in said apparatus compartment, a cooling unit in said food storage compartment, said rectifier and condenser being connected serially between said boiler and said cooling unit, means providing for the circulation of air over the absorber, rectifier and condenser to cool the same, a combustible fuel burner for heating said boiler, means for conducting the products of combustion into heat exchange relation with said rectifier to vary the cooling effect of said air, means for controlling the quantity of products of combustion conducted into heat exchange relation with said rectifier, and means for controlling said control means in accordance with the temperature of said circulating air.

7. In an absorption refrigerating apparatus including a boiler, an absorber, a rectifier, a condenser and an evaporator, means for circulating an inert medium in a closed circuit between the evaporator and absorber, means for circulating absorption solution in a closed circuit between the boiler and absorber, means for heating said boiler, said rectifier and said condenser being connected serially between said boiler and said evaporator, means providing for the circulation of room air over said rectifier, means utilizing waste heat from the boiler for compensating for changes in room temperature so as to maintain the temperature of the rectifier independently of room temperature and thermostatic means for controlling the operation of said last mentioned means.

8. In an absorption refrigerating apparatus including a boiler and a rectifier, means for providing for circulation of room air over said rectifier, means for heating said boiler, and means utilizing waste heat from the boiler for compensating for changes in room temperature so as to maintain the temperature of the rectifier independently of room temperature, said last named means being responsive to room temperature.

9. The process of distilling and rectifying a solution of a solute in a solvent in which the solute has a lower boiling temperature than the solvent, said process comprising applying heat to said solution in a distillation zone to liberate the solute in vapor form, conducting said vapor and any vapor of the solvent which may be liberated to a rectification zone, cooling said vapor by flowing a cooling medium in heat exchange relation therewith in said rectification zone to condense the vapor of the solvent and utilize the heat of condensation of the solvent to re-evaporate any vapor of the solute which may be condensed and leading waste heat from said distillation zone to said rectification zone to maintain its temperature between the boiling temperatures of the solute and solvent and varying the quantity of waste heat led to said rectification zone with variations in the temperature of said cooling medium.

10. The process of distilling and rectifying a solution of a solute in a solvent in which the solute has a lower boiling temperature than the solvent, said process comprising applying heat to said solution in a distillation zone to liberate the solute in vapor form, conducting said vapor and any vapor of the solvent which may be liberated to a rectification zone, cooling said vapor by flowing a cooling medium in heat exchange relation therewith in said rectification zone to condense the vapor of the solvent and utilizing its heat of condensation to re-evaporate any solute which may be condensed, leading waste heat from said distillation zone to said rectification zone to maintain its temperature between the boiling temperatures of said solute and solvent, and controlling the quantity of waste heat conducted to said rectification zone in accordance with the temperature of the cooling medium.

11. The process of distilling and rectifying a solution of a solute in a solvent in which the solute has a lower boiling temperature than the solvent, said process comprising applying heat to said solution by means of a combustible fuel in a distillation zone to liberate the solute in vapor form, conducting said vapor and any vapor of the solvent which may be liberated to a rectification zone, cooling said vapor by flowing a cooling medium in heat exchange relation therewith in said rectification zone to condense the vapor of the solvent and utilizing its heat of condensation to reevaporate any solute which may be condensed, conducting waste products of combustion from said distillation zone to said rectification zone to maintain its temperature between the boiling temperatures of said solute and solvent, and controlling the quantity of waste products of combustion conducted to said rectification zone in accordance with the temperature of the cooling medium.

12. An absorption refrigerating apparatus comprising a cabinet having an apparatus compartment and a food storage compartment, a boiler, an absorber, a rectifier and a condenser in said apparatus compartment, means providing for the circulation of air over the absorber, rectifier and condenser to cool the same, a cooling unit in said food storage compartment, said rectifier and condenser being connected serially between said boiler and said cooling unit, means for directing waste heat from said boiler into the air stream for said rectifier, and thermostatic means for regulating the quantity of heat directed into said rectifier cooling air stream, said rectifier and directing means being positioned in said apparatus compartment remotely from said storage compartment.

13. That improvement in the art of absorption refrigeration which includes the steps of applying heat to a solution of a refrigerant in an absorbent having a higher boiling temperature to liberate the refrigerant in vapor phase, removing absorbent vapor from the refrigerant vapor by conducting the vapor mixture into heat transfer relation with a cooling medium, maintaining the temperature of the vapor mixture undergoing cooling at a value between the boiling points of the refrigerant and the absorbent by subjecting such vapors to heat wasted in the vaporizing step and varying the quantity of waste heat to which such vapors are subjected with variations in the temperature of said cooling medium.

CURTIS C. COONS.